(12) United States Patent
Levy et al.

(10) Patent No.: US 11,165,521 B2
(45) Date of Patent: Nov. 2, 2021

(54) ANALOG SIGNAL TRANSMISSION WITH MULTIPLE ANTENNAS

(71) Applicant: Amimon Ltd., Ra'anana (IL)

(72) Inventors: Dror Shalom Levy, Shoham (IL); Zvi Reznic, Tel Aviv (IL); Arie Israel, Petach-Tikva (IL); Ron Yogev, Netanya (IL)

(73) Assignee: AMIMON LTD., Ra'anana (IL)

( * ) Notice: Subject to any disclaimer, the term of this patent is extended or adjusted under 35 U.S.C. 154(b) by 357 days.

(21) Appl. No.: 16/466,035

(22) PCT Filed: Nov. 30, 2017

(86) PCT No.: PCT/IB2017/057534
§ 371 (c)(1),
(2) Date: Jun. 3, 2019

(87) PCT Pub. No.: WO2018/109603
PCT Pub. Date: Jun. 21, 2018

(65) Prior Publication Data
US 2019/0356401 A1 Nov. 21, 2019

Related U.S. Application Data

(60) Provisional application No. 62/433,389, filed on Dec. 13, 2016.

(51) Int. Cl.
*H04B 17/336* (2015.01)
*H04B 17/24* (2015.01)
(Continued)

(52) U.S. Cl.
CPC ............. *H04B 17/336* (2015.01); *H04B 7/06* (2013.01); *H04B 17/24* (2015.01); *H04L 5/0007* (2013.01);
(Continued)

(58) Field of Classification Search
CPC .............. H04N 21/42676; H04B 17/24; H04B 17/336; H04B 7/06; H04B 7/02–12; H04L 5/0007; H04L 5/0023
See application file for complete search history.

(56) References Cited

U.S. PATENT DOCUMENTS 4,713,689 A * 12/1987 Veillard ................. H04N 11/08
348/727
4,882,589 A * 11/1989 Reisenfeld ............... H01Q 3/24
342/374
(Continued)

OTHER PUBLICATIONS

International Search Report (ISR) in PCT/IB2017/057534, dated Mar. 7, 2018.
(Continued)

*Primary Examiner* — Dung B Huynh
(74) *Attorney, Agent, or Firm* — Eitan Mehulal Sadot (57) ABSTRACT

A method for analog transmission of video from a transmitter using multiple transmit antennas includes transmitting analog video signals through at least two antennas to a receiver, monitoring at the receiver an attribute of the channels between the transmit antennas and an antenna of the receiver, and changing a phase and magnitude of an analog video signal being transmitted through at least one of the at least two antennas responsive to the monitoring. Additionally, a method for analog transmission of video signals using multiple transmit antennas includes space-time coding.

22 Claims, 6 Drawing Sheets

(51) Int. Cl.
*H04B 7/06* (2006.01)
*H04L 5/00* (2006.01)
*H04N 21/426* (2011.01)

(52) U.S. Cl.
CPC ..... *H04L 5/0023* (2013.01); *H04N 21/42676* (2013.01)

(56) References Cited

U.S. PATENT DOCUMENTS

| | | | | |
|---|---|---|---|---|
| 5,040,211 A * | 8/1991 | Schreiber | H04N 7/1696 | 380/214 |
| 5,177,767 A * | 1/1993 | Kato | H04B 1/69 | 375/142 |
| 5,309,478 A * | 5/1994 | Lim | H04N 19/46 | 375/285 |
| 5,666,365 A * | 9/1997 | Kostreski | H04B 7/0671 | 348/614 |
| 5,809,065 A * | 9/1998 | Dapper | H03D 5/00 | 329/347 |
| 6,256,302 B1 * | 7/2001 | Siegle | H04H 20/31 | 370/343 |
| 6,507,626 B1 * | 1/2003 | Limberg | H04L 27/066 | 375/321 |
| 6,563,857 B1 * | 5/2003 | Shi | H04B 1/70718 | 375/140 |
| 7,433,425 B1 * | 10/2008 | Lou | H04H 20/26 | 375/316 |
| 8,588,193 B1 * | 11/2013 | Ho | H04B 7/0619 | 370/338 |
| 10,187,151 B2 * | 1/2019 | Harel | H04W 88/085 | |
| 2001/0028688 A1 * | 10/2001 | Bargauan | H03C 3/40 | 375/322 |
| 2002/0050948 A1 * | 5/2002 | Tanaka | G01S 3/14 | 342/378 |
| 2003/0002567 A1 * | 1/2003 | Yi | H04B 7/0808 | 375/147 |
| 2005/0239419 A1 * | 10/2005 | Fudaba | H04B 17/12 | 455/101 |
| 2006/0072499 A1 * | 4/2006 | Kent | H04B 7/0857 | 370/328 |
| 2006/0115005 A1 * | 6/2006 | Hickling | H03C 3/40 | 375/247 |
| 2006/0209890 A1 * | 9/2006 | MacMullan | H04N 5/4401 | 370/468 |
| 2007/0042725 A1 * | 2/2007 | Poilasne | H04B 1/1027 | 455/101 |
| 2007/0091999 A1 * | 4/2007 | Nissan-Cohen | H04N 19/166 | 375/240.2 |
| 2007/0121939 A1 * | 5/2007 | Olesen | H04W 12/033 | 380/201 |
| 2007/0177670 A1 * | 8/2007 | Elnathan | H04L 1/1816 | 375/240.18 |
| 2007/0263745 A1 * | 11/2007 | Hayase | H04B 7/0854 | 375/267 |
| 2008/0094524 A1 * | 4/2008 | Schobben | H04R 5/04 | 348/738 |
| 2008/0102881 A1 * | 5/2008 | Han | H04B 7/0443 | 455/522 |
| 2008/0123752 A1 * | 5/2008 | Chen | H04L 27/362 | 375/240.26 |
| 2008/0134254 A1 * | 6/2008 | Xia | H04N 21/44227 | 725/62 |
| 2008/0227389 A1 * | 9/2008 | Sakata | H04L 1/06 | 455/39 |
| 2008/0316369 A1 * | 12/2008 | Yamamoto | H03J 1/0066 | 348/725 |
| 2009/0086647 A1 * | 4/2009 | Shnaider | H04B 7/0634 | 370/252 |
| 2009/0252204 A1 * | 10/2009 | Shatara | H01Q 21/28 | 375/216 |
| 2009/0316829 A1 * | 12/2009 | Rofougaran | H04B 7/08 | 375/299 |
| 2010/0020907 A1 * | 1/2010 | Rezvani | H04L 25/03057 | 375/347 |
| 2011/0105064 A1 * | 5/2011 | Kusano | H04B 7/0617 | 455/129 |
| 2011/0129025 A1 * | 6/2011 | Jaeckel | H03M 13/356 | 375/260 |
| 2011/0317595 A1 * | 12/2011 | Kanda | H04B 7/0408 | 370/277 |
| 2012/0114059 A1 * | 5/2012 | Harel | H04B 7/06 | 375/267 |
| 2012/0122407 A1 * | 5/2012 | Allpress | H04B 7/0632 | 455/67.11 |
| 2012/0220238 A1 * | 8/2012 | Hosoya | H04B 17/373 | 455/63.4 |
| 2012/0269302 A1 | 10/2012 | Ancora | | |
| 2013/0003637 A1 * | 1/2013 | Elenes | H04L 27/22 | 370/312 |
| 2013/0084818 A1 | 4/2013 | Croman | | |
| 2013/0086206 A1 * | 4/2013 | Sultenfuss | H04W 76/15 | 709/217 |
| 2013/0121342 A1 * | 5/2013 | Kim | H04B 7/0617 | 370/436 |
| 2013/0121438 A1 * | 5/2013 | Murakami | H04B 7/06 | 375/295 |
| 2013/0147609 A1 * | 6/2013 | Griffin | G06K 7/10356 | 340/10.5 |
| 2014/0153625 A1 * | 6/2014 | Vojcic | G06F 11/1625 | 375/224 |
| 2015/0049711 A1 * | 2/2015 | Hwang | H04L 5/0053 | 370/329 |
| 2015/0094004 A1 | 4/2015 | Vora et al. | | |
| 2015/0117435 A1 * | 4/2015 | Baldemair | H04W 72/0453 | 370/343 |
| 2015/0146584 A1 * | 5/2015 | Wang | H04B 7/0617 | 370/278 |
| 2016/0301557 A1 * | 10/2016 | Yuda | H04L 27/2675 | |
| 2017/0244457 A1 * | 8/2017 | Tholen | H04B 7/08 | |
| 2017/0302357 A1 * | 10/2017 | Lyu | H04B 7/0617 | |
| 2018/0269946 A1 * | 9/2018 | Choi | H04W 24/08 | |
| 2018/0278301 A1 * | 9/2018 | Kim | H04W 72/085 | |
| 2019/0036637 A1 * | 1/2019 | Giorgi | H04J 14/0298 | |
| 2019/0208164 A1 * | 7/2019 | Chen | H04N 19/619 | |
| 2019/0222296 A1 * | 7/2019 | Khandani | H04B 7/1555 | |

OTHER PUBLICATIONS

Written Opinion of the International Searching Authority (WO-ISA) in PCT/IB2017/057534, dated Mar. 7, 2018.
International Preliminary Report on Patentability (IPRP) in PCT/IB2017/057534, dated Jun. 18, 2019.

* cited by examiner

ANALOG SIGNAL TRANSMISSION WITH MULTIPLE ANTENNAS

CROSS-REFERENCE TO RELATED APPLICATIONS

This application is a National Stage of PCT international patent application number PCT/IB2017/057534, having an international filing date of 30 Nov. 2017, published as international publication number WO 2018/109603 A1, which is hereby incorporated by reference in its entirety; which claims the benefit and priority from U.S. Provisional Patent Application No. 62/433,389, filed 13 Dec. 2016, which is hereby incorporated in its entirety by reference.

FIELD OF THE INVENTION

The present invention relates to analog transmission generally and to a system and method for analog signal transmission using multiple antennas.

BACKGROUND OF THE INVENTION

Analog transmission is a method of transmitting audio, video and other data using a continuous signal which may vary in amplitude, phase and frequency. Typically, a transmitter modulates the data by combining the data signal with a carrier signal which is then transmitted to a receiver. The receiver may then demodulate the combined signal to retrieve the data signal and extract the transmitted data. Known applications for analog transmission methods may include television and radio broadcasting systems, telephone and other voice communication systems, and surveillance systems, among others. A more recent application is in remote controlled vehicle (RCV) systems.

Technological advancements have contributed to an increased popularity in the use of RCVs. These RCVs may include flying vehicles, commonly referred to as UAVs (Unmanned Aerial Vehicle) or drones, such as planes, helicopters, and multi-rotors. The RCVs may also include land vehicles and marine vehicles.

RCVs are generally piloted by a user (pilot) using one of two techniques; either by line-of-sight (LOS) or using first-person-view (FPV). Using LOS, the pilot actually views the RCV, for example, a drone, at all times and controls the drone's flight accordingly. Using FPV, a camera on board the drone transmits using wireless communications a video image of the surroundings which is displayed to the pilot on a screen and/or on goggles (worn by the pilot).

Most systems using FPV rely on the use of analog transmitters on the RCV to transmit to the pilot the analog video signals from the camera. Use of analog transmission may be potentially advantageous over other known transmission methods (i.e. digital transmission) as the transmission is essentially real-time, that is, there is essentially zero latency between the image captured by a camera and that displayed to a user, for example, the pilot of the RCV. Another advantage is that analog transmission is more robust to varying channel conditions (e.g. varying SNR) compared to digital transmission. For example, with analog transmission, video quality degradation due to interference or fading, or to the transmitter nearing the boundary of the transmission/reception range, may be reflected by increasing noise in the displayed image to the user (e.g. the RCV pilot), whereas, with digital transmission, the image may disappear, stutter, or freeze.

Analog transmissions may be affected by multipath fading, for example, where a transmitted video signal received by the user (e.g. received by RCV pilot's receiver) may be attenuated and even cancelled by the signal propagating through different paths. Furthermore, the received video signal may be affected as a result of loss of signal directional focus between the transmitter antenna and the receiver antenna, for example, as may occur during RCV maneuvering.

To reduce multipath fading and/or to maintain continuous signal directional focus, the transmitter may include several transmitting antennas (i.e. the RCV may be installed with several transmitting antennas). Numerous techniques used for transmitting the video signal using multiple antennas are known in the art. One technique may involve transmitting a different analog stream through each antenna. Another technique may involve use of diversity by transmitting a single analog stream through the multiple antennas. In some cases, the single analog stream may be encoded with an error-correcting code, for example, the Hadamard code. Still another technique may include the use of adaptive beamforming where the signals transmitted through the multiple antennas are manipulated to increase signal strength in a predetermined direction.

SUMMARY OF THE PRESENT INVENTION

There is provided, in accordance with an embodiment of the present invention, a method for analog transmission of video from a transmitter using multiple transmit antennas, the method includes transmitting analog video signals through at least two antennas to a receiver, monitoring at the receiver an attribute of the channels between the transmit antennas and an antenna of the receiver, and changing a phase and magnitude of an analog video signal being transmitted through at least one of the at least two antennas responsive to the monitoring.

In some embodiments of the present invention, changing a phase and magnitude may include multiplying the analog video signal being transmitted through at least one of the two antennas by a complex number.

In some embodiments of the present invention, the method may include multiplying a baseband signal of the analog video signal by a factor −1 or 1.

In some embodiments of the present invention, the method may include transmitting digital signals through at least two antennas of the multiple transmit antennas.

In some embodiments of the present invention, the attribute may include a signal to noise (SNR) ratio associated with reconstructed analog signals and reconstructed digital signals.

In some embodiments of the present invention, changing may occur when the SNR of a reconstructed digital video signal is greater than that of a reconstructed analog video signal.

In some embodiments of the present invention, the digital video signals are space-time coded.

In some embodiments of the present invention, transmitting of digital video signals and analog video signals may include orthogonal frequency-division multiplexing (OFDM).

In some embodiments of the present invention, changing phase may include switching between ports in a differential signal in the transmitter.

In some embodiments of the present invention, the differential signal may be generated at an interface of a base-band modem and a RF (radio frequency) circuit in the transmitter.

There is provided, in accordance with an embodiment of the present invention, a system for analog transmission of video including a transmitter and multiple antennas, the transmitter suitable to transmit analog video signals through at least two antennas of the multiple antennas. Additionally included is a receiver suitable to monitor an attribute of the channels between the at least two transmitting antennas and an antenna of the receiver. Furthermore, the transmitter is configured to change a phase and magnitude of an analog video signal being transmitted through at least one of the at least two transmitting antennas responsive to the monitoring.

In some embodiments of the present invention, the transmitter may change a phase and magnitude by multiplying the analog video signal being transmitted through at least one of the at least two antennas by a complex number.

In some embodiments of the present invention, the transmitter may multiply a baseband signal of the analog video signal by a factor –1 or 1.

In some embodiments of the present invention, the transmitter may be suitable to transmit digital signals through the at least two antennas of the multiple transmit antennas.

In some embodiments of the present invention, the attribute may include a signal to noise (SNR) ratio associated with analog signals and digital signals reconstructed by the receiver.

In some embodiments of the present invention, changing may occur when the SNR of a digital video signal received by the receiver is greater than that of a reconstructed analog video signal.

In some embodiments of the present invention, the digital video signals and analog video signals transmitted by the transmitter may include orthogonal frequency-division multiplexing (OFDM). In some embodiments of the present invention, the digital video signals may be space-time coded.

In some embodiments of the present invention, the transmitter may change phases by switching between ports in a differential signal.

In some embodiments of the present invention, the differential signal may be generated at an interface of a baseband modem and a RF (radio frequency) circuit in the transmitter.

There is provided, in accordance with an embodiment of the present invention, a method for analog transmission of video signals using multiple transmit antennas and space-time code.

There is provided, in accordance with an embodiment of the present invention, a system for analog transmission of video signals including a transmitter and multiple antennas, the transmitter suitable to transmit through the multiple antennas using space-time code.

In some embodiments of the present invention, the space-time code may be the Alamuti code.

In some embodiments of the present invention, the analog transmission may include converting an analog video signal to a complex analog signal prior to transmission.

In some embodiments of the present invention, the analog transmission may include orthogonal frequency-division multiplexing (OFDM).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that existing techniques used to transmit analog signals, including analog video signals, through multiple transmit antennas may exhibit numerous drawbacks. One drawback may be that transmitting a different analog stream through each transmit antenna may require that the receiver have multiple antennas for reception and may also require that the transmitter have multiple upconverters which may contribute to an increase in system cost and system complexity. A second drawback may be that the receiver may potentially suffer from poor SNR if the channel matrix is ill-conditioned so that transmitting a single analog stream through the multiple antennas may result in destructive superposition. The destructive superposition may even occur when error correction codes (ECC) are used (e.g. Hadamard) as the transmission may suffer from concatenation of the ECC and channel fading. A third drawback may involve the use of beamforming which may require pre-defined training sequences for vector estimation and may result in waste of bandwidth, in addition to possibly requiring multipliers and phase shifters.

Applicants have further realized that space-time coding (STC), which adds redundancy in both spatial and temporal domains and introduces correlation into transmitted analog and digital video signals, may be used to overcome the drawbacks of the existing techniques used for transmission of analog video signals using multiple transmit antennas. This may be achieved by applying known STC techniques to either analog and/or digital video signals, such as for example, Alamouti coding, STBC (space-time block coding), and STTC (space-time trellis coding), among other STC, and operating on the analog video signal with a complex analog signal.

In a first embodiment of the present invention, which is described with reference to a RCV system although the skilled person may realize that the present invention may be practiced to include other types of analog transmission systems, an RCV may transmit an analog video signal and a STC digital video signal through multiple transmit antennas to the pilot's receiver. The receiver may be configured to monitor attributes of the channel between the transmitting antennas and the receiving antennas and to output a signal which may be transmitted to the RCV on an uplink (UL) channel as a feedback signal which may be indicative of the channel attributes. These attributes may include but not be limited to, any one or any combination of the following: measuring the signal-to-noise ratio of the received reconstructed digital and analog signals, measuring the power levels of the received signals, estimating the bit error rate in the received signals, estimating the channel characteristics between all transmit antennas and all receive antennas (e.g. channel gain and/or phase between each transmit antenna and each receive antenna). In some embodiments, the output signal may be indicative of the measured SNR of the received digital signal being greater than that of the received analog signal by a predetermined margin. In some embodiments, the feedback signal may be indicative of the measured SNR of the received digital signal exceeding a predetermined threshold.

Responsive to reception of the feedback signal, the RCV transmitter may modify the the analog video signal being transmitted on one or more channels associated with the multiple antennas by introducing a complex analog signal to cause a phase and/or magnitude change in the modified analog video signal. In some embodiments, modifying the analog video signal may include modifying I and Q components of the baseband signal on one or more of the channels. In some embodiments, the modification may include multiplying the I and Q components of the modified signal by a factor of −1 or 1. In some embodiments, the analog video signals may be transmitted in analog bins of OFDM (Orthogonal Frequency Division Multiplexing) transmissions and the digital video signals may be transmitted in the digital bins.

In a second embodiment of the present invention, also described with reference to a RCV system although the skilled person may realize that the present invention may be practiced to include other types of analog transmission systems, the RCV may transmit through the multiple antennas analog video signals which may be modified by a complex analog signal. In some embodiments, the modification may include multiplying the analog video signals by the complex analog signal. Modification may include use of STC encoding using known STC techniques and may include Alamouti coding. In some embodiments, the analog video signal may be transmitted through the multiple antennas during a first time slot and the modified analog video signal may be transmitted during the next (second) time slot. In some embodiment, the modified analog video signal may include the complex conjugate of the analog video signal. In some embodiments, the transmissions are in analog bins of OFDM transmissions.

Figure 1:
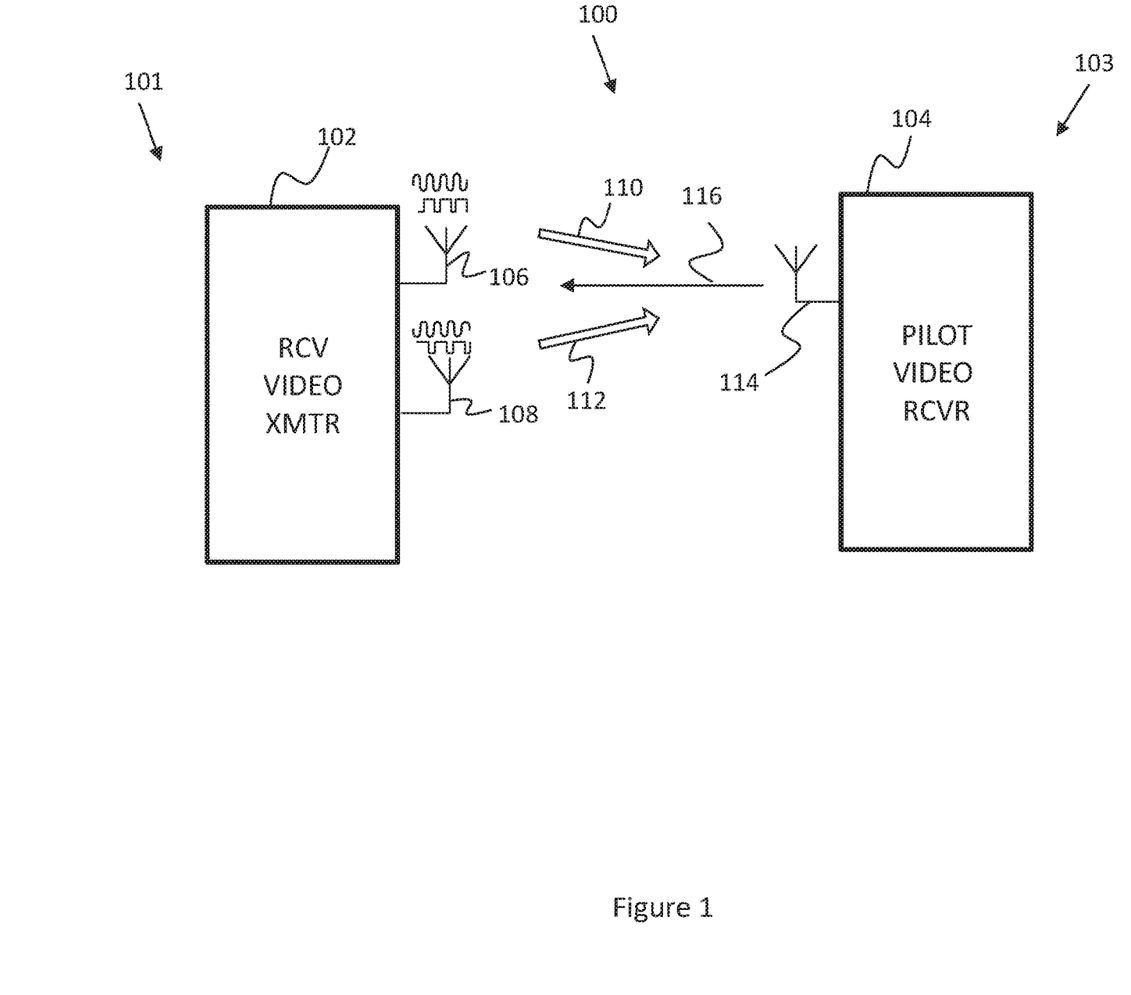
FIG. 1 schematically illustrates an exemplary RCV system including a RCV suitable to transmit analog video signals through multiple antennas to a pilot's base station (and/or goggles), according to an embodiment of the present invention.

Reference is now made to FIG. 1 which schematically illustrates an exemplary RCV system 100 including a video transmitter 102 with multiple antennas on a RCV 101 and a video receiver 104 on a base station 103 (and/or goggles) which may be used by a pilot, according to an embodiment of the present invention. RCV system 100 may be a UAV system, a land vehicle system, or a marine vehicle system.

Video transmitter 102, which may be an OFDM transmitter, may transmit both analog video signals and digital video signals through multiple antennas, for example two antennas 106 and 108. The transmissions may be in parallel, for example the digital video signals in digital OFDM bins and the analog video signals in analog OFDM bins which may be transmitted through antennas 106 and 108. Alternatively, the transmissions through antennas 106 and 108 may be sequential, for example, the digital and analog video transmissions may be first transmitted through one antenna and then through the other. The digital video transmissions may be STC encoded in video transmitter 102 and may, in some embodiments, be encoded using Alamouti coding. Transmissions of the analog and digital video signals may be on downlink (DL) channels from antennas 106 and 108, respectively, indicated by arrows 110 and 112.

Video receiver 104, which may be an OFDM receiver, may receive through one or more antennas both the analog video signals and the STC encoded digital video signals, for example, through a single antenna 114 as shown. Video receiver 104 may monitor the channel attributes in the received signals, which may include, for example the SNR of the received analog video signals (SNRa) and of the digital video signals (SNRd), and may additionally compare the values.

Base station 103 may produce a feedback signal 116 which may be transmitted to RCV 101 on an UL channel responsive to the SNR monitoring by video receiver 104 and may be indicative of the monitored SNRd of the received digital video signal being greater than that of the monitored SNRa of the received analog video signal by a predetermined margin. Additionally or alternatively, feedback signal 116 may be indicative of the monitored SNRd being equal to or exceeding a predetermined threshold. Additionally or alternatively, feedback signal 116 may include information regarding the monitored SNRa of the received analog video signal. In some embodiments, feedback signal 116 may not be transmitted when SNRa is substantially equal to SNRd, or is greater than SNRd, or when the difference between SNRa and SNRd does not exceed a predetermined threshold. In some embodiments, lack of transmission of feedback signal 116 may be indicative of SNRd being greater than SNRa by a predetermined margin or SNRd exceeding the predetermined threshold.

In operation, video transmitter 102 may respond to RCV reception of feedback signal 116 (or lack of reception) according to any one of the following conditions, the operation of the video transmitter explained further on below with respect to FIGS. 2 and 3:

a. if the measured SNRd is greater than the measured SNRa and/or exceeds SNRa by a predetermined threshold, video transmitter 102 may modify the analog video signal on one or more channels with a complex analog signal, for example, by multiplying the analog video signal on one of the DL channels, say the channel associated with antenna 106, by the complex analog signal. The analog video signal on the second channel, associated with antenna 108, may remain as is.

b. if the measured SNRa is equal to or greater than the measured SNRd, or the difference between them does not exceed the predetermined threshold, video transmitter 102 may continue to transmit the video analog signal through the two antennas 106 and 108 (without the need to modify one of the signals using a complex analog signal).

Figure 2:
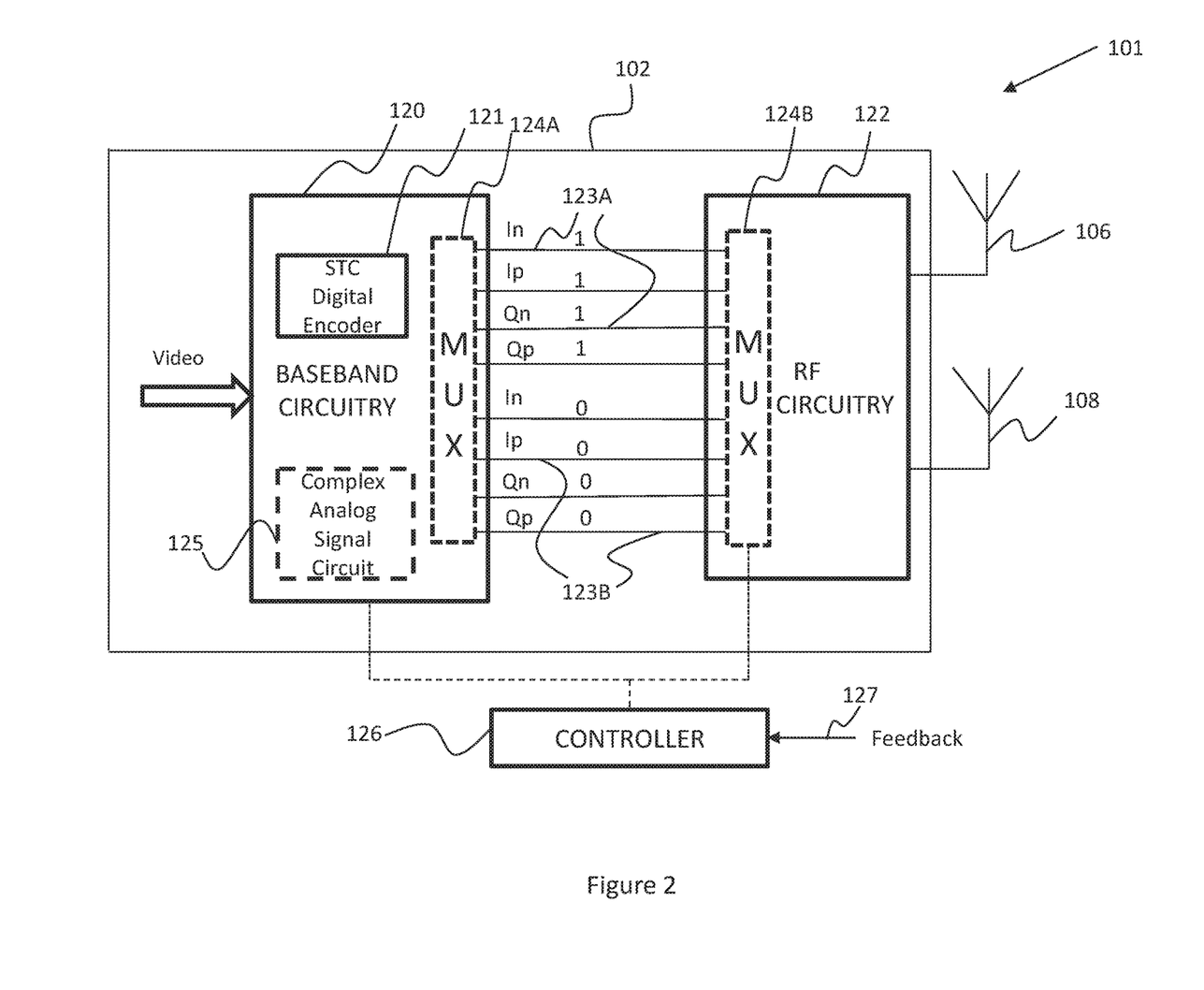
FIG. 2 schematically illustrates a functional block diagram of an exemplary section of the RCV including a video transmitter and a RCV controller, according to an embodiment of the present invention.

Reference is now also made to FIG. 2 which schematically illustrates a functional block diagram of an exemplary section of RCV 101 including video transmitter 102 and a RCV controller 126, according to an embodiment of the present invention. Video transmitter 102 includes baseband circuitry 120 which may be part of a dedicated baseband (BB) chip, and RF circuitry 122 which may be part of a dedicated RF chip.

Baseband circuitry 120 may convert the analog video signal and/or digital video signal from a video camera on RCV 101 into a complex-value baseband signal which may be represented by its I component (real part) and Q component (imaginary part). The baseband signal may be divided according to the antenna through which it will be transmitted so that complex value components transmitted through antenna 106 may be identified by In and Qn, and those through antenna 108 may be identified by Ip and Qp. The I and Q components are generally transmitted as a differential signal, as represented by dual lines 123A associated with In and Qn, and dual lines 123B associated with Ip and Qp, at the interfacing between baseband circuitry 120 and RF circuitry 122.

Baseband circuitry 120 may include a STC digital encoder 121 to add redundancy both in the spatial and temporal domains to the digital video signal to be transmitted. STC digital encoder 121 may use any suitable STC technique, although it may be appreciated that an Alamouti encoder may be suitably used with systems having a transmitter with two antennas and a receiver with only one antenna.

Baseband circuitry 120 may additionally include an optional complex analog signal circuitry 125 to modify the complex-value baseband signal on one or both of the channels by a complex analog signal. For example, complex analog signal circuitry 125 may multiply the baseband signal by the complex analog signal in order to shift the phase of the analog video signal being transmitted through one of the antennas so as to superpose the analog video signals transmitted through antennas 106 and 108 and prevent partial or total cancellation of the analog video signal at video receiver 104. Optionally, multiplying the baseband signal by the complex analog signal may modify the amplitude of the analog video signal being transmitted through one of the antennas. It may be appreciated that, although the above example refers to modifying only one of the analog video signals being transmitted through only one of the antennas, that both signals to be transmitted by both antennas may be accordingly modified.

In some embodiments, baseband circuitry may allow for replacing In and Qn with Ip and Qp respectively (or Ip and Qp by In and Qn) to promote superposition of the signals and increase the SNRa measured at video receiver 104. In some embodiments, the replacement of the I and Q components on one of the channels may be done by multiplying the components by −1 or −1, and may be implemented by switching ports of the differential signal in a multiplexer 124A which may be optionally included in baseband circuitry 120. Optionally, multiplexer 124A may be part of complex analog signal circuitry 125. Operation of complex analog circuitry 125 and/or optional multiplexer 124A may be responsive to signaling from controller 126 in response to a feedback input signal 127 associated with feedback signal 116.

RF circuitry 122 may convert the differential signal from the I and Q components to an RF signal for transmission through antennas 106 and 108. Multiplexer 124A may be alternatively implemented in RF circuitry 122 as optional multiplexer 124B to allow switching ports of the differential signals. As previously described with regards to optional multiplexer 124A, optional multiplexer 124B may operate responsive to signaling from controller 126.

Figure 3:
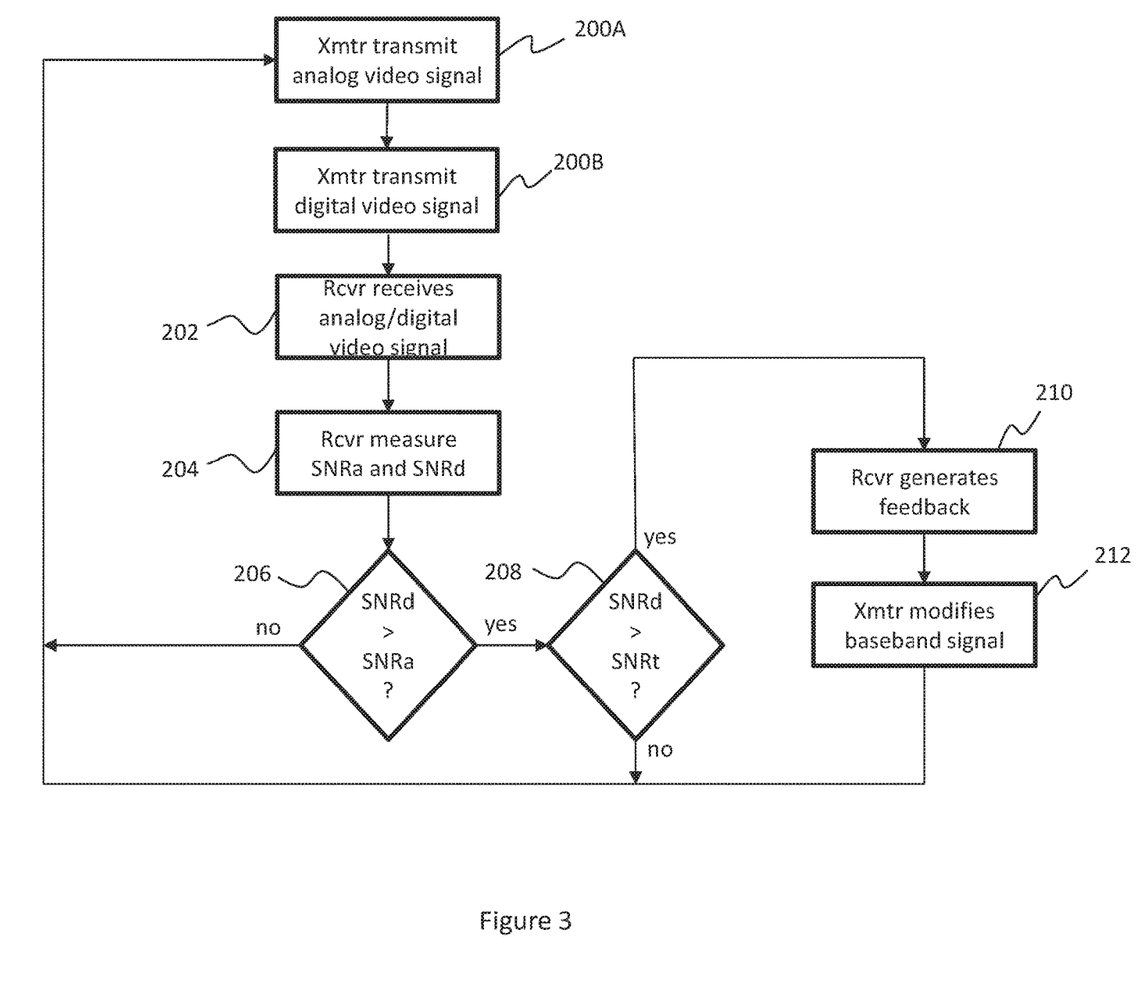
FIG. 3 is a flow chart of an exemplary method of transmitting analog video signals using multiple antennas and STC, according to an embodiment of the present invention.

Reference is now made to FIG. 3 which is a flow chart of an exemplary method of transmitting analog video signals using multiple antennas and STC, according to an embodiment of the present invention. The skilled person may readily appreciate that the flow chart is for illustrative purposes, and that the method may be implemented using more or less steps, or using a different sequence steps, and which may include any combination of adding steps, skipping steps, and rearranging steps. For exemplary purposes, the method is described with reference to RCV system 100 and its components.

At 200A, RCV video transmitter 102 may transmit an analog video signal using the analog bins of the OFDM transmissions. The analog video signal may be transmitted in parallel through antennas 106 and 108. Alternatively the analog video signal may first be transmitted through one antenna, for example antenna 106, followed by transmission of the analog video signal through the second antenna 108.

At 200B, RCV video transmitter 102 may transmit a digital video signal using the digital bins of the OFDM transmissions and may be transmitted simultaneously with the analog video signals (during transmission of the analog video signal). The digital video signal may be transmitted in parallel through antennas 106 and 108. Alternatively the digital video signal may first be transmitted through one antenna, for example antenna 106, followed by transmission of the analog video signal through the second antenna 108. The digital video signal may be encoded using STC and may include Alamouti encoding. During a first time slot T1, the complex-value baseband signal of the digital video signal may be transmitted followed, during a second time slot T2, by transmission of its complex conjugate signal.

At 202, video receiver 104 receives (reconstructs) the transmitted digital video signal and the analog video signal.

At 204, video receiver 104 measures SNRd of the received digital video signal and SNRa of the received video analog signal.

At 206, video receiver 104 compares SNRd with SNRa. If SNRd is less than or equal to SNRa, transmission of the analog video signal may continue under the present conditions as there is no destructive interference (partial or total cancellation) resulting from the analog transmission through the multiple antennas—return to 200A to continue transmissions. If SNRd is greater than SNRa, continue to optional step 208 and if there is no step 208, continue to 210.

At optional 208, video receiver 104 may compare SNRd with a predetermined threshold SNRt. If SNRd is less than or equal to SNRt, transmission of the analog video signal may continue under the present conditions—return to 200A for new transmissions. If SNRd is greater than SNRt, continue to 210.

At 210, video receiver 104 may generate an output signal indicative that SNRd is much greater than SNRa. Base unit 103 may transmit feedback signal 116 to RCV 101.

At 212, controller 126 receives feedback input 127 and activates complex analog signal circuit 125. The complex-value baseband signal on one of the channels may be modified by a complex analog signal generated by complex analog circuitry 127 and may include modifying the phase and/or magnitude of the baseband signal. In some embodiments, the modification may include multiplying the complex-value baseband signal by a complex number. In some embodiments, the modification may include multiplying the I and Q components, for example In and Qn, by a factor of −1 or 1. In some embodiments, the modification may include switching ports in optional multiplexer 124A or 124B. Return to 200A for new transmissions.

Figure 4:
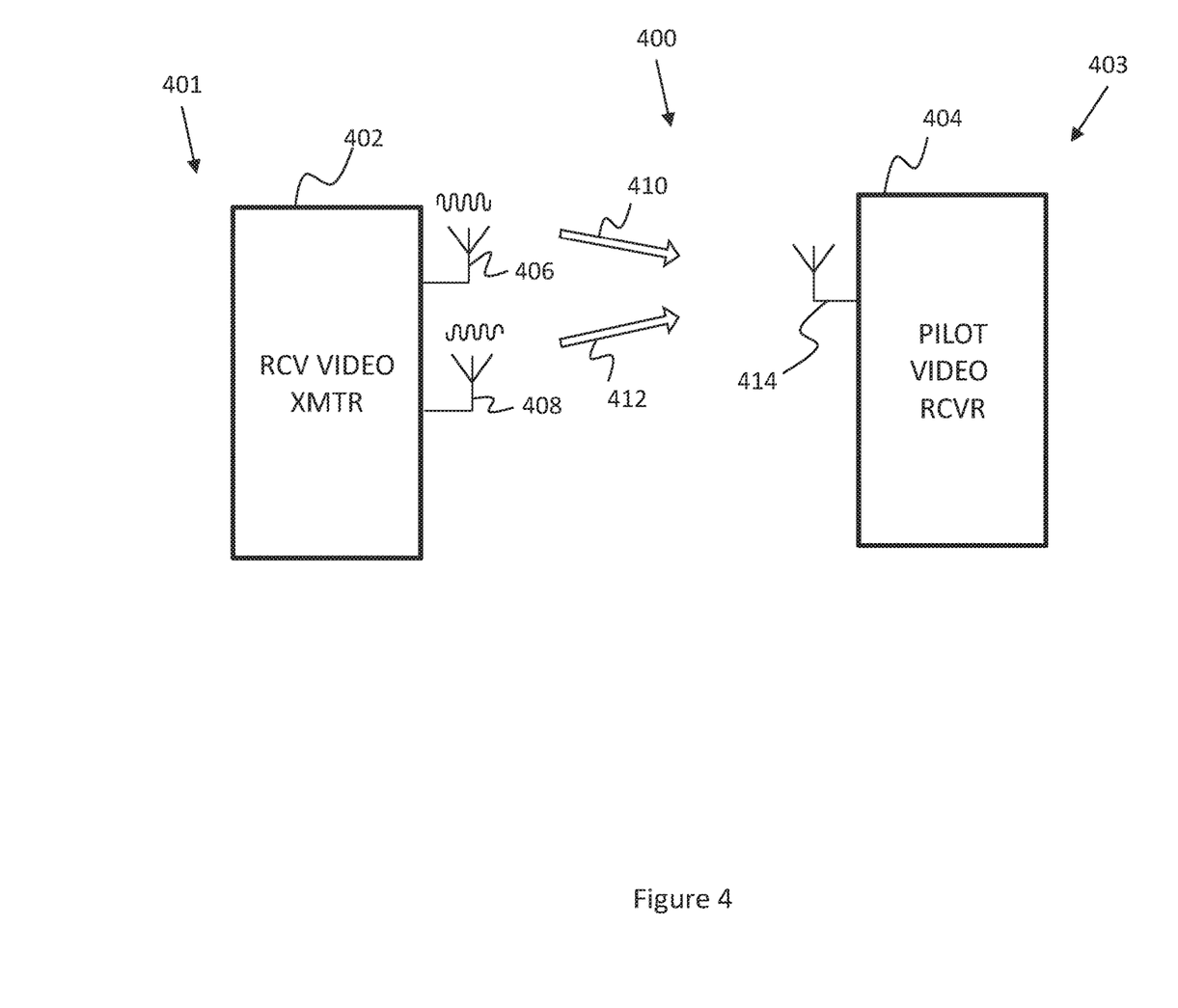
FIG. 4 schematically illustrates another exemplary RCV system including a RCV suitable to transmit analog video signals through multiple antennas to a pilot's base station (and/or goggles), according to an embodiment of the present invention.

Reference is now made to FIG. 4 which schematically illustrates an exemplary RCV system 400 including a RCV 401 suitable to transmit analog video signals through multiple antennas to a pilot's base station 403 (and/or goggles), according to an embodiment of the present invention. RCV system 400 may be a UAV system, a land vehicle system, or a marine vehicle system, and may include a video transmitter 402 on RCV 401 and a video receiver 404 on base station 403.

Video transmitter 402, which may be an OFDM transmitter, may transmit analog video signals through multiple antennas, for example two antennas 406 and 408. The transmissions may be in parallel in analog OFDM bins which may be transmitted through antennas 406 and 408. Alternatively, the transmissions through antennas 406 and 408 may be sequential, for example, first through one antenna and then through the other.

The analog video transmissions may be STC encoded in video transmitter 402 and may, in some embodiments, be encoded using Alamouti coding. The encoding may include modifying the analog video signal using a complex analog signal. In some embodiments, the encoding may yield a modified analog video signal which is the complex conjugate of the original analog video signal. The analog video signal may then be transmitted through antennas 406 and 408 during a first time slot and the modified analog video signal may be transmitted during the next (second) time slot. Transmissions of the analog video signals may be on downlink (DL) channels from antennas 406 and 408, respectively, indicated by arrows 410 and 412.

Figure 5:
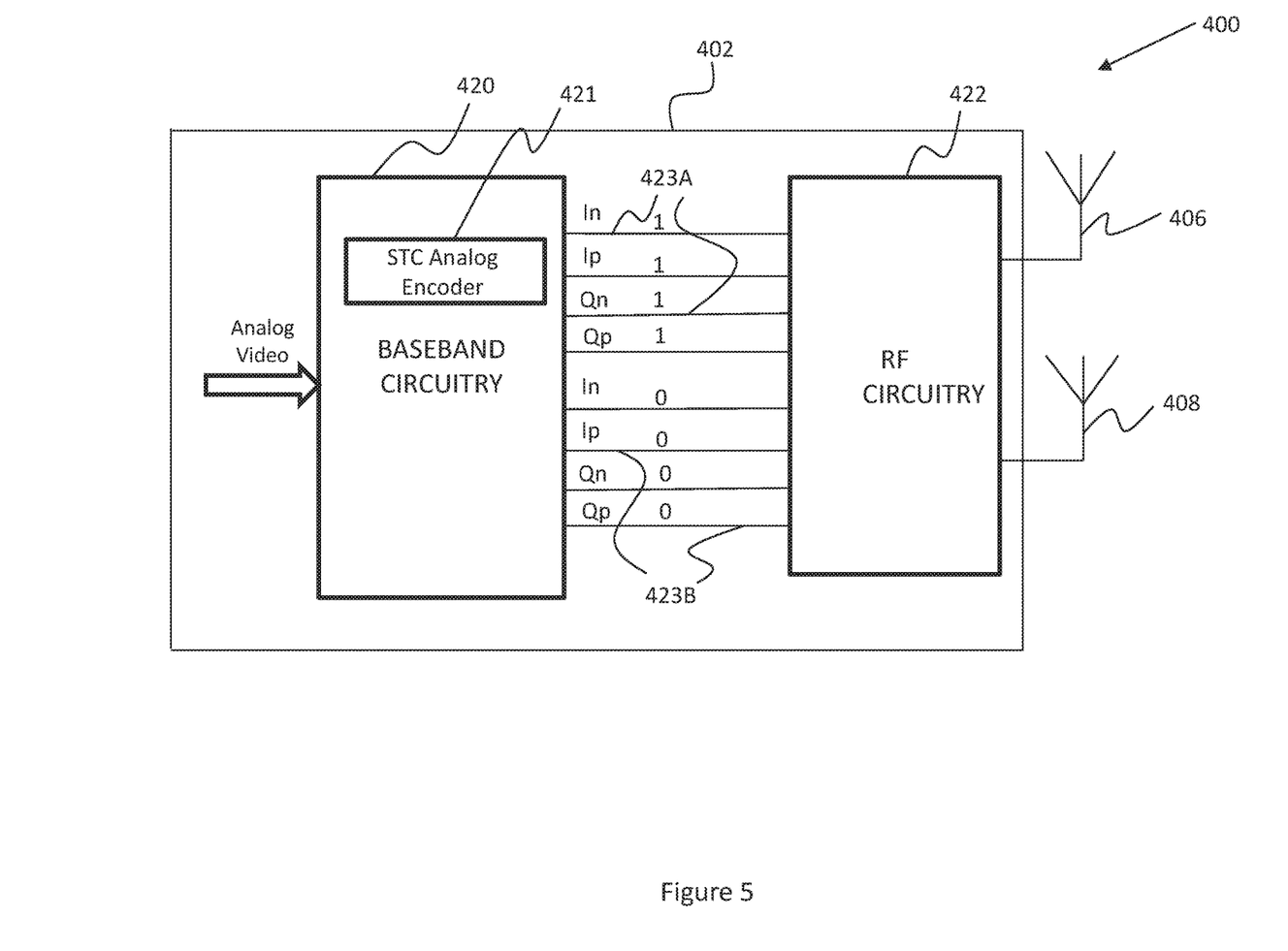
FIG. 5 schematically illustrates a functional block diagram of an exemplary section of the RCV of FIG. 4 including a video transmitter, according to an embodiment of the present invention.

Reference is now also made to FIG. 5 which schematically illustrates a functional block diagram of an exemplary section of RCV 401 including video transmitter 402, according to an embodiment of the present invention. Video transmitter 402 includes baseband circuitry 420 which may be part of a dedicated baseband (BB) chip, and RF circuitry 422 which may be part of a dedicated RF chip.

Baseband circuitry 420 may convert the analog video signal from an analog video camera on RCV 401 into a complex-value baseband signal which may be represented by its I component (and Q component. The baseband signal may be divided according to the antenna through which it will be transmitted so that complex value components transmitted through antenna 406 may be identified by In and Qn, and those through antenna 408 may be identified by Ip and Qp. The I and Q components are generally transmitted as a differential signal, as represented by dual lines 423A associated with In and Qn, and dual lines 423B associated with Ip and Qp, at the interfacing between baseband circuitry 420 and RF circuitry 422.

Baseband circuitry 420 may include a STC analog encoder 421 to add redundancy both in the spatial and temporal domains to the analog video signal to be transmitted. STC analog encoder 421 may use any suitable STC technique, although it may be appreciated that an Alamouti encoder may be suitably used with systems having a transmitter with two antennas and a receiver with only one antenna. STC encoder 421 may modify the complex-value baseband signal with a complex analog signal to generate a modified analog video signal which may include the complex conjugate of the original signal. In operation, during time slot T1, the complex-value baseband signals may be transmitted through antennas 406 and 408, and during time slot T2, the complex conjugate signals may be transmitted through the antennas. RF circuitry 422 may convert the differential signal from the I and Q components to an RF signal for transmission through antennas 406 and 408.

Figure 6:
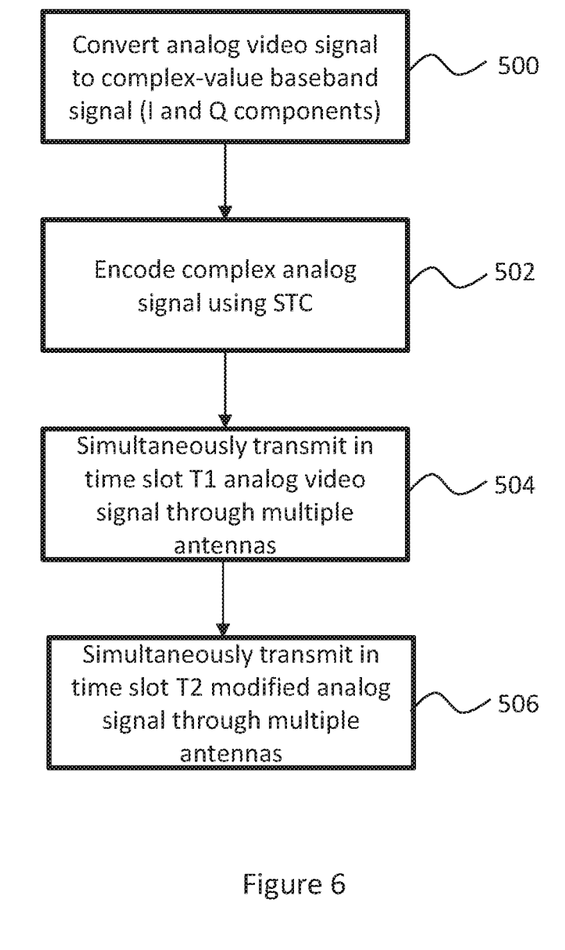
FIG. 6 is a flow chart of an exemplary method of transmitting analog video signals using multiple antennas and STC, according to an embodiment of the present invention.

Reference is now made to FIG. 6 which is a flow chart of an exemplary method of transmitting analog video signals using multiple antennas and STC, according to an embodiment of the present invention. The skilled person may readily appreciate that the flow chart is for illustrative purposes, and that the method may be implemented using more or less steps, or using a different sequence steps, and which may include any combination of adding steps, skipping steps, and rearranging steps. For exemplary purposes, the method is described with reference to RCV system 400 and its components.

At 500, the analog video signal from analog video camera in RCV 101 may be converted in baseband circuitry 420 into a complex-value baseband signal which may be divided for transmission through antennas 406 and 408. The complex-value baseband signals may be represented by In and Qn for transmission through antenna 406 and Ip and Qp for transmission through antenna 408.

At 502, STC encoding of the complex-value baseband signals may be performed, optionally using Alamouti coding. The STC encoded complex-value baseband signals may include the complex conjugate of the complex-value baseband signals.

At 504, the complex-value baseband signals may be simultaneously transmitted through antennas 406 and 408 during time slot T1.

At 506 the complex conjugate signals may be simultaneously transmitted through antennas 406 and 408 during time slot T2.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for analog transmission of video from a transmitter using multiple transmit antennas, the method comprising:
   transmitting analog video signals through at least two antennas to a receiver;
   transmitting digital signals to said receiver through said at least two antennas of said multiple transmit antennas;
   monitoring at the receiver an attribute of channels between the transmit antennas and an antenna of the receiver,
   wherein said attribute comprises a signal to noise ratio (SNR) associated with reconstructed analog signals and reconstructed digital signals; and
   changing a phase and a magnitude of an analog video signal being transmitted through at least one of said at least two antennas responsive to said monitoring,
   wherein said changing occurs when said SNR of a reconstructed digital video signal is greater than that of a reconstructed analog video signal.

2. The method according to claim 1, wherein the changing of the phase and the magnitude comprises:
   multiplying said analog video signal being transmitted through at least one of said at least two antennas by a complex number.

3. The method according to claim 2, comprising:
   multiplying a baseband signal of said analog video signal by a factor of −1 or 1.

4. The method according to claim 1, wherein said digital video signals are space-time coded.

5. The method according to claim 1, wherein said transmitting of digital video signals and analog video signals comprises orthogonal frequency-division multiplexing (OFDM).

6. The method according to claim 1, wherein the changing phase comprises switching between ports in a differential signal in the transmitter.

7. The method according to claim 6, wherein the differential signal is generated at an interface of a baseband modem and a radio frequency (RF) circuit in the transmitter.

8. The method according to claim 1, wherein said transmitting of analog video signals comprises: performing analog transmission of video signals by using multiple transmit antennas and space-time code.

9. The method of claim 8, wherein the space-time code is Alamouti code.

10. The method of claim 8, wherein said performing analog transmission comprises converting an analog video signal to a complex analog signal prior to transmission.

11. The method of claim 8, wherein said analog transmission comprises orthogonal frequency-division multiplexing (OFDM).

12. A system for analog transmission of video, comprising:
   a transmitter with multiple antennas, said transmitter configured to transmit analog video signals through at least two antennas of said multiple antennas,
   wherein said transmitter is configured to transmit digital signals through said at least two antennas of said multiple transmit antennas;
   a receiver configured to monitor an attribute of channels between said at least two transmitting antennas and an antenna of said receiver,
   wherein said attribute comprises a signal to noise ratio (SNR) associated with analog signals and digital signals reconstructed by said receiver;
   wherein said transmitter is configured to perform a change of a phase and a magnitude of an analog video signal being transmitted through at least one of said at least two transmitting antennas responsive to the monitoring, wherein said change is performed when the SNR of a digital video signal received by said receiver is greater than that of a reconstructed analog video signal.

13. The system according to claim 12, wherein said transmitter changes the phase and the magnitude by multiplying said analog video signal being transmitted through at least one of said at least two antennas by a complex number.

14. The system according to claim 13, wherein said transmitter multiplies a baseband signal of said analog video signal by a factor of −1 or 1.

15. The system according to claim 12, wherein said digital video signals are space-time coded.

16. The system according to claim 12, wherein said digital video signals and analog video signals transmitted by said transmitter comprises orthogonal frequency-division multiplexing (OFDM).

17. The system according to claim 12, wherein said transmitter changes the phase by switching between ports in a differential signal.

18. The system according to claim 12, wherein said differential signal is generated at an interface of a baseband modem and a radio frequency (RF) circuit in said transmitter.

19. The system according to claim 12, wherein said transmitter is configured to transmit through said multiple antennas using space-time code.

20. The system of claim 19,
wherein said space-time code is Alamouti code.

21. The system of claim 19,
wherein said transmitter is configured to convert an analog video signal to a complex analog signal prior to transmission.

22. The system of claim 19,
wherein said transmitter is configured to perform analog transmission using orthogonal frequency-division multiplexing (OFDM).

* * * * *